United States Patent
Cavallaro, Jr.

(10) Patent No.: US 7,000,753 B2
(45) Date of Patent: Feb. 21, 2006

(54) BULKHEAD-MOUNTED WOOD STORAGE AND TRANSPORTATION DEVICE

(76) Inventor: Joseph L. Cavallaro, Jr., 146 Plymouth Dr. Apartment B, Norwood, MA (US) 02062

(*) Notice: Subject to any disclaimer, the term of this patent is extended or adjusted under 35 U.S.C. 154(b) by 0 days.

(21) Appl. No.: 10/770,055

(22) Filed: Feb. 2, 2004

(65) Prior Publication Data
US 2005/0167237 A1    Aug. 4, 2005

(51) Int. Cl.
*B65G 11/16* (2006.01)
(52) U.S. Cl. .................................. 193/2 R; 193/33
(58) Field of Classification Search .............. 193/4, 193/5, 7, 8, 9, 2 R, 33; 232/44, 47, 48

See application file for complete search history.

(56) References Cited

U.S. PATENT DOCUMENTS

| | | | | |
|---|---|---|---|---|
| 4,498,557 A | * | 2/1985 | Horne | 182/49 |
| 4,606,431 A | * | 8/1986 | Ruder, Sr. | 182/49 |
| 4,943,048 A | * | 7/1990 | Hentges | 472/116 |
| 4,991,691 A | * | 2/1991 | Brawer et al. | 182/106 |
| 5,319,818 A | * | 6/1994 | Baranowski | 14/71.1 |
| 5,535,848 A | * | 7/1996 | Giuliano et al. | 182/49 |
| 5,634,440 A | * | 6/1997 | Mogck | 119/847 |
| 5,715,910 A | * | 2/1998 | Koch et al. | 182/200 |
| 6,109,854 A | * | 8/2000 | Thompson et al. | 414/398 |

* cited by examiner

Primary Examiner—Douglas Hess
(74) Attorney, Agent, or Firm—Gary E. Lambert; Patrick D. Archibald; Lambert & Associates

(57) ABSTRACT

A chute assembly for connecting an elevated area to a lower area, such as within a cellar entry enclosure, for transporting items. The chute assembly may also include a bin enclosure for storage of the items in addition to transporting them.

2 Claims, 5 Drawing Sheets

BULKHEAD-MOUNTED WOOD STORAGE AND TRANSPORTATION DEVICE

FIELD OF THE INVENTION

This invention relates generally to the field of chute assemblies for storing and transporting items, specifically to a bulkhead-mounted wood storage and transportation device.

BACKGROUND OF THE INVENTION

Transporting items from the outside to the indoor portion of a building or dwelling place is often cumbersome, time-consuming and difficult. With respect to the transportation of firewood, the task is extremely burdensome. Firewood is traditionally stacked in large quantities in rows outside a dwelling place, and brought within the dwelling place in smaller amounts. For example, a typical arrangement would be for a homeowner to have two or more cords of firewood stacked within the yard surrounding the home. Due to space limitations of the common home, the homeowner is limited to keeping a one or two day supply of firewood inside, in close proximity to the fireplace or woodstove.

A very common method of transporting the firewood indoors is for the homeowner, or the homeowner's family members, to manually carry loads of firewood into the house in their arms. Only a small number of logs can be carried in this manner, requiring many trips into the cold each time the indoor supply of firewood has been depleted. Further, it is often the case that an additional person is required to "watch the door" and open it for the person carrying the logs, for the person carrying the logs is often unable to do anything but support the load of firewood being carried. One result of utilizing this method of transporting firewood is that many trips are often required. Additionally, the door to the outside must be repeatedly opened and closed, which in turn allows heat to escape the dwelling, in direct contravention of the ultimate purpose of bringing fuel into the home in the first instance.

What is needed is a device that will change the traditional means of transporting firewood from the outside to an inside area, that solves these many problems.

Homeowners, and others that store firewood in the outdoors face other problems in addition to transporting the wood indoors. Storing the majority of wood outdoors requires some method of weather protection for the wood itself. Tarps are often employed to keep snow and rain off the tops of woodpiles, as wet wood burns very poorly. Firewood that has become wet must first be dried; accordingly, it cannot be efficiently burned for some time after being brought indoors. Additionally, the greater the number of woodpiles stacked in the yard, the greater the number of unsightly, blue tarps covering the piles. This eyesore detracts from the aesthetic value of the homeowner's yard, as well as potentially upsetting the homeowner's neighbors.

What is needed is a device that will store firewood in such a way that will allow additional time for wet wood to dry prior to burning, reduce the overall quantity of wood stored in the yard, as well as enable people utilizing firewood as a fuel source an alternative intermediate storage location.

SUMMARY OF THE INVENTION

Accordingly, it is an object of the present invention to provide a novel way to transport and store firewood within the home without the limitations and problems associated with traditional methods.

It is also an object of the present invention to provide a device that allows people who use firewood to heat their homes greater latitude in deciding when to transport wood from the outside to inside the home.

Additionally, it is an object of the present invention to provide an intermediate storage location that is efficient, easy, and safe to access.

The present invention comprises a chute assembly having mounting members, upon which at least one slide member is fastened. The mounting members may be affixed to any surface that connects an elevated area to a lower area. The mounting members may be attached to an existing stairway, but it is not necessary that a stairway actually be present. If a stairway is not present, the mounting members should be constructed of suitable material that is strong enough to support the weight of the firewood, or other items, that are transported or stored upon them. It will be seen then that the present invention forms a sloping angle, with respect to a horizontal plane, as it runs from the elevated to lower areas. The slide member(s) may be constructed of steel, wood, plastic, or similar material. It is desirable that the slide member be sufficiently smooth to allow logs to move down the slope in a substantially unimpeded manner, however, the normal surface of common sheet metal, or the like, would be sufficiently smooth.

One embodiment of the present invention comprises the chute assembly mounted within a cellar entry enclosure. This enclosure is commonly referred to as a "bulkhead" in the northeast region of the United States. The bulkhead typically consists of a number of stairs descending into the cellar of a building from the outside. There are typically two sets of doors associated with the bulkhead, one set provides access from the outside into the bulkhead, the other entry connects the bulkhead space to the cellar, hence an enclosure is formed. Although infrequently insulated or heated, the bulkhead does normally provide protection from the elements, and thus is an ideal place to store and transport firewood. In addition, the chute assembly and accompanying storage capabilities allows those using firewood the freedom to choose when to bring more wood to the fireplace or wood stove. A bulkhead enclosure is generally wasted space in that it is often unused the majority of the time. Thus, this location is an ideal place for the present invention, in that the owner of the bulkhead can choose whether to leave the chute in place permanently, or remove it when the bulkhead is to be used for other purposes.

The present embodiment includes a pair of mounting members attached to the outer edges of the bulkhead stairs, along the enclosure walls. The mounting members could be attached to the stairs themselves, or the enclosure walls if possible, via bolts or other suitable attachment means.

This embodiment also includes a pair of slide members that are connected to the mounting members by hinges. The hinges allow the slide members to be pulled upwards at right angles to the stairway, in a stowed position. This allows for continued use of the bulkhead stairs for other purposes when the chute is not being employed. When deployed, the slide members should overlap in the center of the stairs to prevent smaller logs, and/or debris from falling to the floor of the bulkhead enclosure. The top portion of the slide members should also be cut at an angle so that when placed in a stowed/open position, the slide members will not hit the top of the bulkhead enclosure.

Additionally, this embodiment includes a swing panel that is pivotally attached to one of the slide members, and releasably attached via a hook, or other suitable means, to the second slide member. By unhooking the releasable section of the swing panel, the panel then may be rotated along the face of the slide member. When the slide member is placed in the stowed/open position, the swing panel will then be adjacent to it, stowed along with the respective slide member. The swing panel and slide members may also include handles as necessary for ease of movement or installation. These handles should not be placed in such a way as to impede the transportation of the firewood. A bin or box of suitable size may be placed at the foot of the slide member so that wood entering the chute from the top may slide directly into the bin. Thus, no further time is needed for stacking or storing the wood. Simply placing wheels on the bottom of the bin allows it to be wheeled away from cellar-bulkhead doorway, and moved to a convenient location.

Another embodiment of the present invention comprises the chute assembly having a pair of mounting members, and a single slide member along with side and front walls. The slide member could be affixed permanently, or temporarily to the mounting members. Permanent fastening could be achieved via bolting, welding, or any suitable method. Temporary fastening could be achieved by locking pin or similar method. The present embodiment contemplates pins permanently affixed to the mounting members in a substantially upright fashion, preferably perpendicular to the plane bisecting the mounting members. Holes cut out of the slide member could thus be placed over the pins and then the entire bin portion could then be dropped over, and supported by, the pins projecting from the mounting members. This arrangement would allow for quick and easy installation and removal of the bin portion of the chute assembly, freeing the bulkhead stairs for other uses when wood transport and/or storage was not required. A handle could also be placed on the slide member or some other suitable portion of the bin portion to provide easy lifting and installation. The sidewalls could be fixed to the mounting members or the slide member, the bottom portion of the side walls cut to follow the slope of the bulkhead stairway. The front panel could be affixed to either the side walls or mounting members, and would be positioned perpendicularly to the side walls to form a bin enclosure, with an open top portion. In this embodiment, the front wall would be hinged along one of the side walls, and releasably fastened to the other side wall via a locking pin, or similar mechanism. The front wall, then, acts as a type of door, or opening, for easy access to wood or other items stored within the bin area. In this embodiment of the present invention, a second bin may or may not be used, as desired. However, due to the fact that the bulkhead shields anything within its enclosure from the elements, wood or other items could be left in the bin portion of the chute assembly indefinitely. A handle could be placed on the front wall to assist with opening and closing the front wall portion, and a cover could also be added, covering the top of the enclosure.

An additional embodiment of the present invention includes an access port, which is nothing more than an opening, or cut away portion, in one of the bulkhead enclosure walls. The advantage of having such an access would be not having to even open the bulkhead enclosure outer doors in order to pass firewood into the dwelling. Additionally, either chute assembly embodiment would be deployed to work in conjunction with this added feature. This embodiment comprises a cylindrical member, such as a length of PVC pipe, could then be passed through the opening, extending on either side of the enclosure wall. The cylindrical member would be secured to the enclosure wall by a recessed plate, or other suitable fastening means, and would also include an end cover to prevent unauthorized access to the inside of the bulkhead enclosure. The end cover could be fastened by any suitable means, including bolts, latches, and the like. Because it is desirable to prevent unauthorized access, the end cover could be fastened by means of a bolt running through hollow portion of the cylindrical member. A simple backing plate and wing-nut on the inside portion of the cylindrical member would be used to secure the end cover. A simple handle fastened to the outside of the end cover, over the outer nut, would provide additional security from unauthorized access. The proximity of the handle to the outer nut would prevent the use of tools to loosen the nut. In addition, the outer nut cannot be removed without comprising the overall integrity of this embodiment, because the distance between the handle and the bolt would be smaller than the width of the nut. The cylindrical member could also be weatherproofed via any commonly used weather sealant.

It should be noted that a variety of materials could be used in constructing the present invention, and materials mentioned herein should be seen as illustrative, and not limiting the present invention. Also, a variety of nut and bolt combinations, and various locking pins, welding, etc. could be used as locking and fastening means.

Other objects and advantages of the present invention will be recognized when the following description is considered along with the drawings.

DETAILED DESCRIPTION OF THE PREFERRED EMBODIMENT

Figure 1:
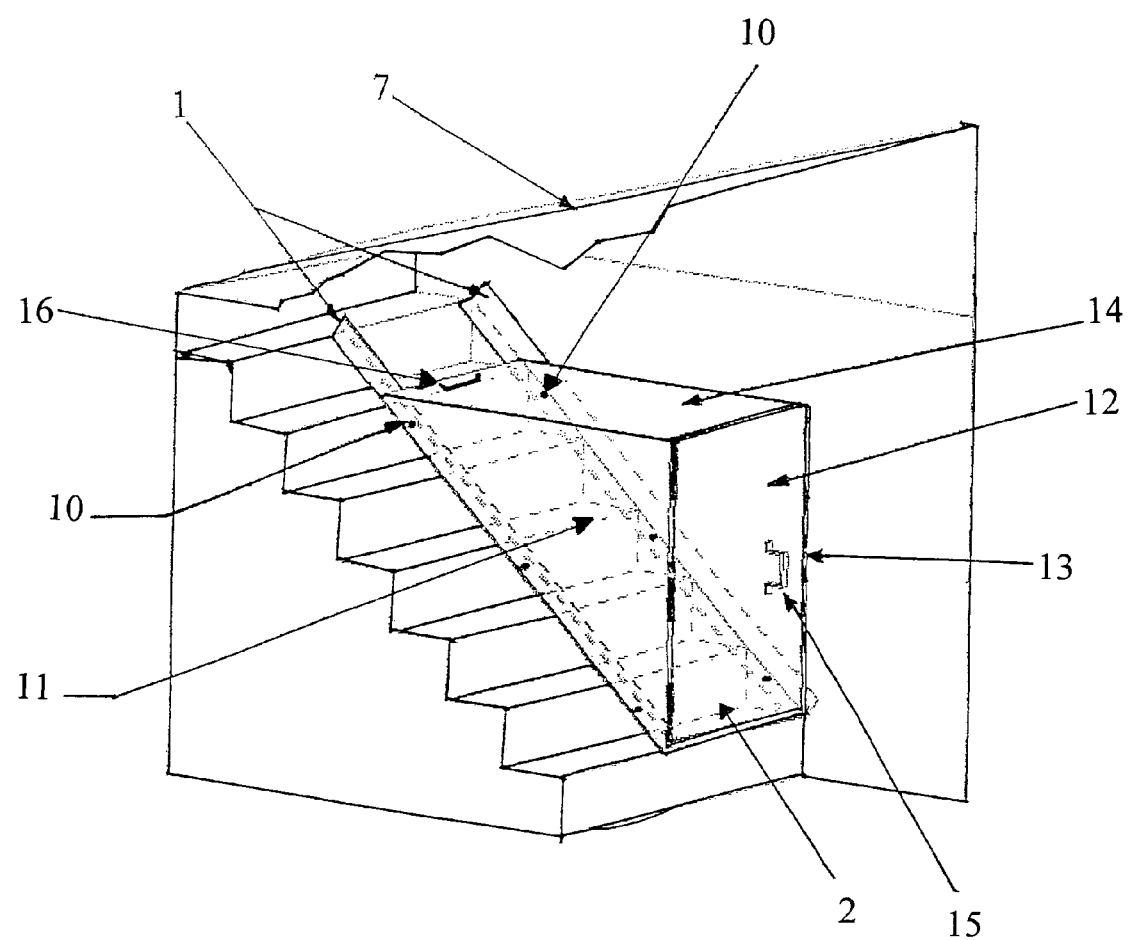
FIG. 1 is a perspective view showing the chute assembly bin embodiment, mounted to a stairway portion of a cellar entry enclosure with the front wall member in a closed position.

Referring to the drawings, FIG. 1 is a perspective illustration showing the chute assembly, fastened to the stairway portion of a cellar entry enclosure 7, by means of mounting members 1. Slide member 2 is shown attached to rod members 10, with opposing side wall members 11 and 14, and front wall member 12, forming the bin enclosure. Locking pin assembly 13 releasably secures front wall member 12 in a closed position. Pulling member 15 is shown attached to front wall member 12, and elevating member 16 is shown attached to slide member 2.

Figure 1A:
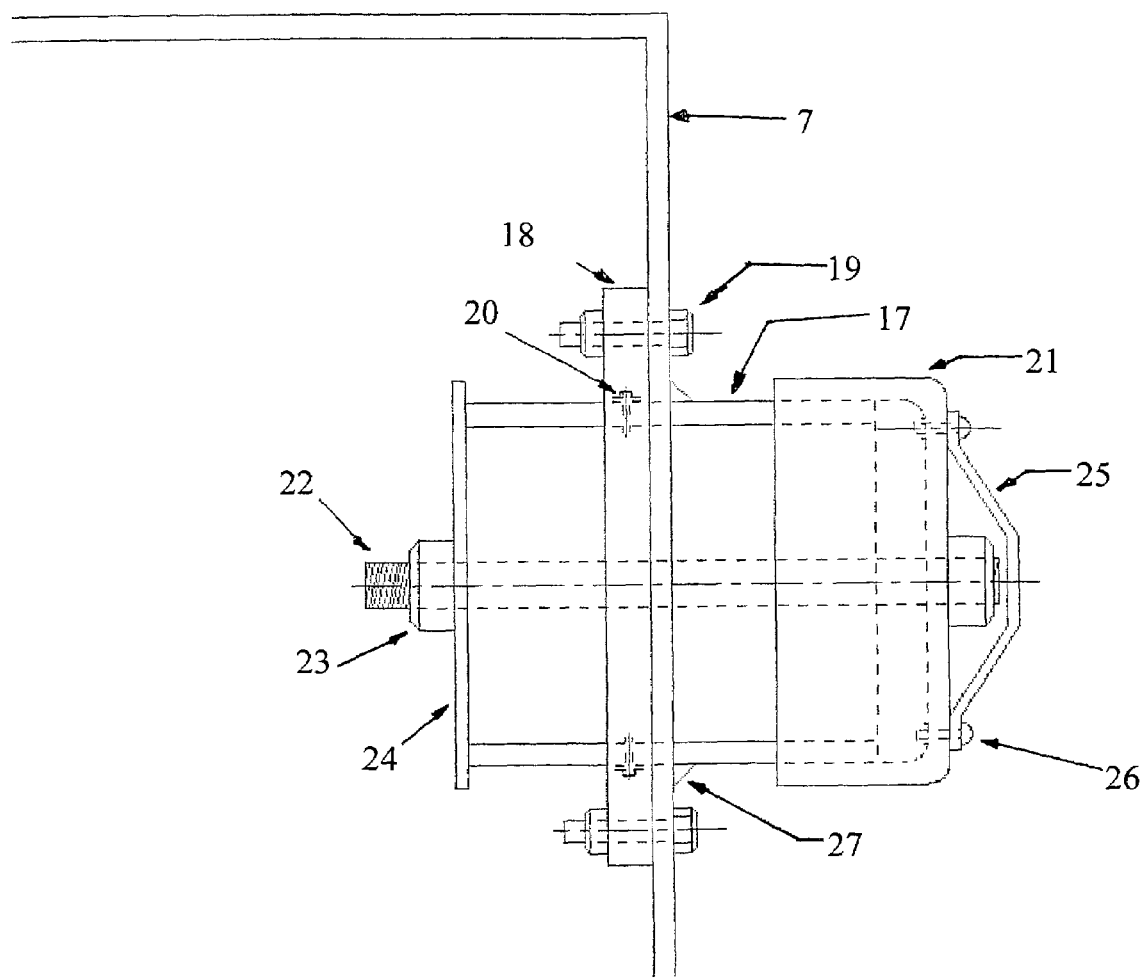
FIG. 1a is side elevation view showing the cylindrical member embodiment passing through the cellar entry enclosure wall, as well as fastening means, and security handle feature.

Referring to FIG. 1a, a side elevation view is shown, displaying cylindrical member details in a mounted position, passing through cellar entry enclosure wall 7. The cylindrical member 17 is secured via backing plate 18, which in turn is secured to enclosure 7 via bolts 19. Locking bolts 20 provide additional stability. End cover 21 is fastened via axial bolt 22 and nut 23, in conjunction with locking plate 24. Security handle 25 is fastened via security bolts 26. Sealant 27 provides a weather tight seal around cylindrical member 1.

Figure 1B:
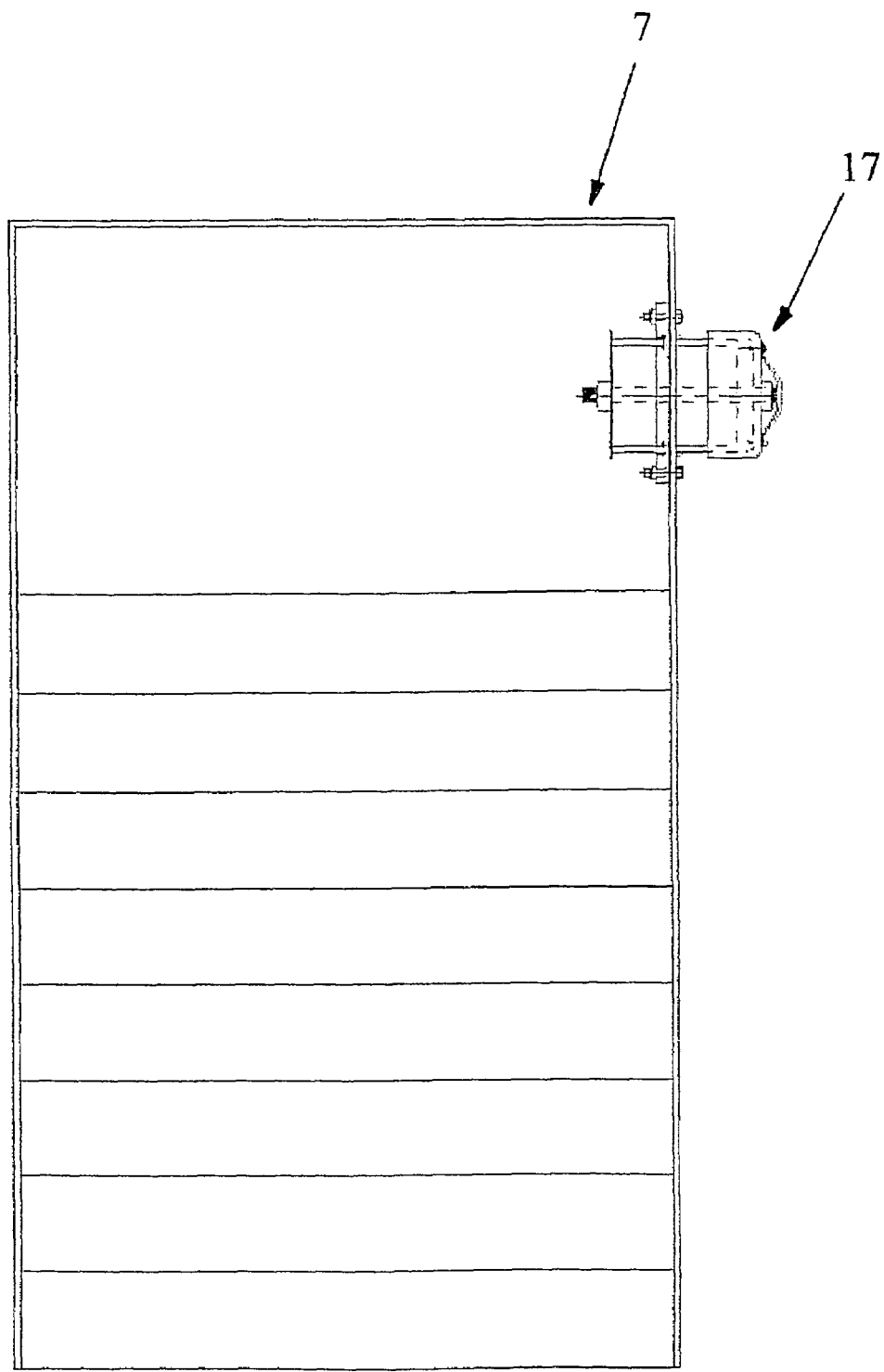
FIG. 1b is a top plan view of a cellar entry enclosure with the cylindrical member embodiment in place.

Referring to FIG. 1b, a top plan view is shown, depicting cylindrical member 17 mounted to side of cellar entry enclosure 7.

Figure 2:
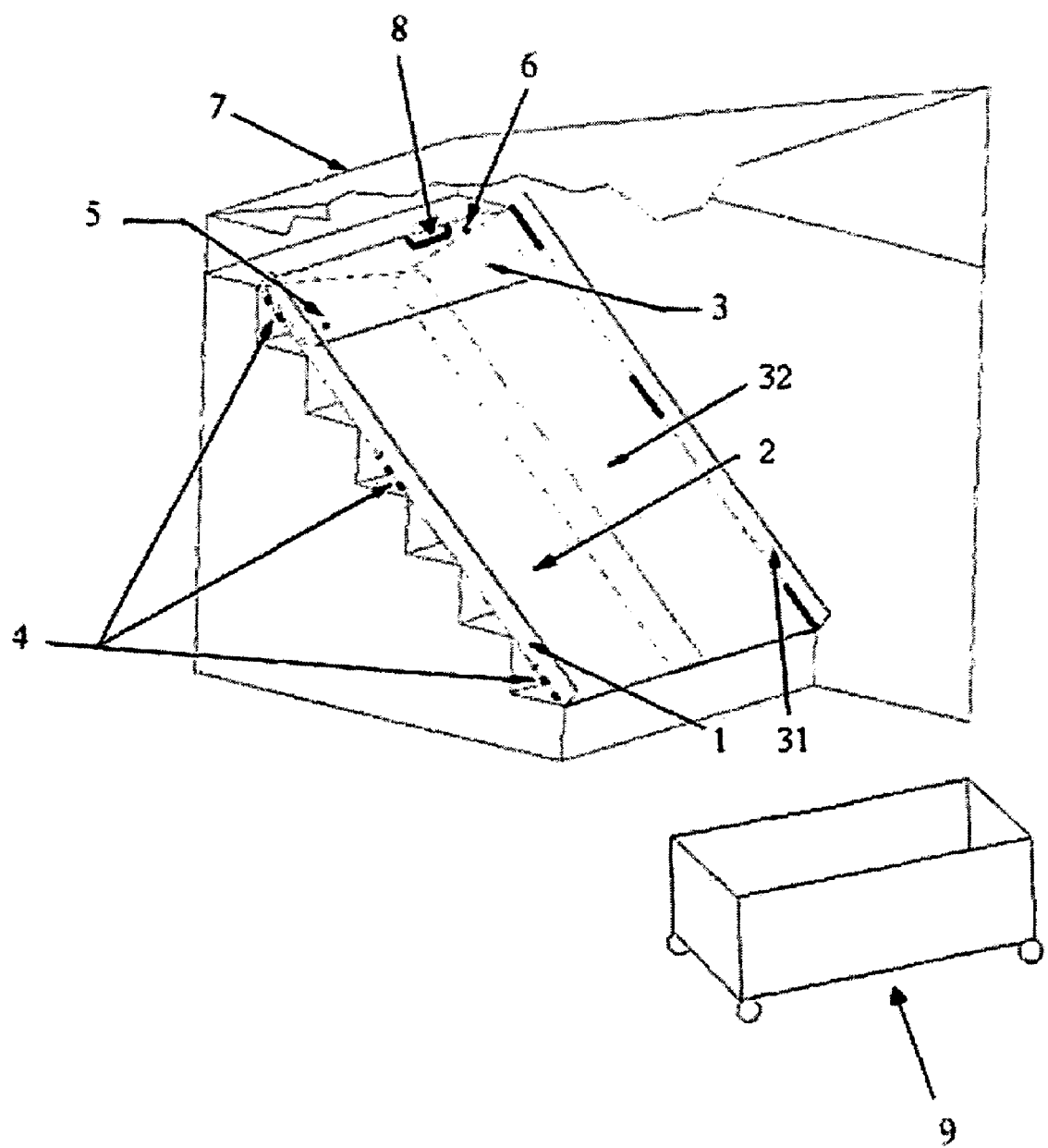
FIG. 2 is a perspective view of the chute assembly showing the hinged slide member embodiment with swing panel in the deployed position.

Referring to FIG. 2, a perspective view is shown, depicting first mounting member 1 and second mounting member 31, upon which first slide member 2 and second slide member 32 are fastened via hinges 4. The chute assembly is portrayed within cellar entry enclosure 7, and the chute is shown in the deployed/closed position with swing panel 3 pivotally supported by pin 5, and releasably supported by hook 6. Lifting member 8 is shown attached to swing panel 3, and storage unit 9 is shown near the bottom portion of the chute.

Figure 3:
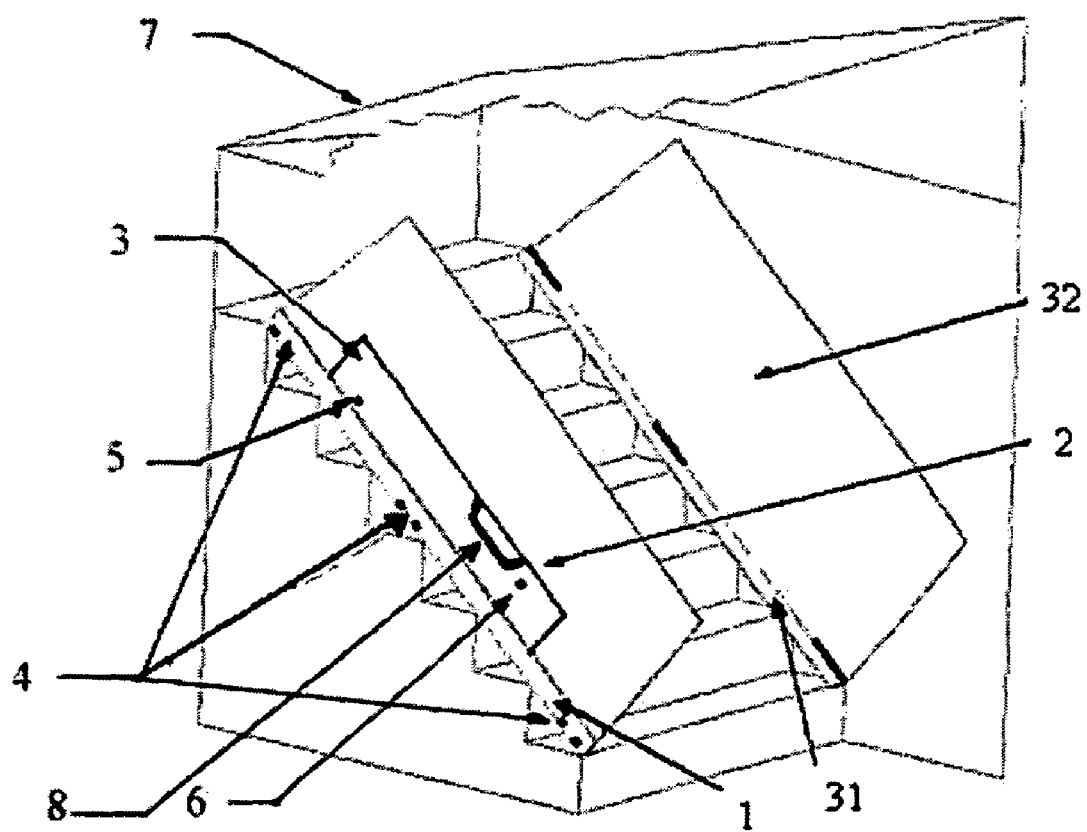
FIG. 3 is a perspective view of the chute assembly showing the hinged slide member embodiment with swing panel in the stowed position.

Referring to FIG. 3, the chute assembly is depicted with first slide member 2 and second slide member 32 in the stowed/open position, with swing panel 3 pivoted to a stowed position via pin 5.

I claim:

1. A chute assembly for transferring firewood through a cellar entry enclosure comprising:
    a first and a second mounting members fastened to a stairway portion of said cellar entry enclosure;
    a first and a second slide member hingably fastened to said first and second mounting members, wherein said first and said second slide members are pivotal from a closed position to an open position.
    a swing panel pivotally fastened to said first slide member, wherein said swing panel is releasably attachable to said second slide member.

2. The chute assembly of claim 1 wherein said first and said second slide members are sufficiently shaped to avoid making contact with said cellar entry enclosure when said first and said second slide members are pivoted to said open position.

* * * * *